US010887241B2

(12) United States Patent
Akahane et al.

(10) Patent No.: US 10,887,241 B2
(45) Date of Patent: Jan. 5, 2021

(54) COMMUNICATION DEVICE, COMMUNICATION SYSTEM, AND COMMUNICATION METHOD

(71) Applicant: ALAXALA Networks Corporation, Kawasaki (JP)

(72) Inventors: Shinichi Akahane, Kawasaki (JP); Nobuhito Matsuyama, Kawasaki (JP); Mitsuru Nagasaka, Kawasaki (JP); Kazuo Sugai, Kawasaki (JP); Takayuki Muranaka, Kawasaki (JP)

(73) Assignee: ALAXALA NETWORKS CORPORATION, Kawasaki (JP)

( * ) Notice: Subject to any disclaimer, the term of this patent is extended or adjusted under 35 U.S.C. 154(b) by 158 days.

(21) Appl. No.: 16/267,415

(22) Filed: Feb. 5, 2019

(65) Prior Publication Data
US 2019/0273690 A1  Sep. 5, 2019

(30) Foreign Application Priority Data

Mar. 5, 2018 (JP) .................................. 2018-039031

(51) Int. Cl.
| | |
|---|---|
| *H04L 12/851* | (2013.01) |
| *H04L 12/46* | (2006.01) |
| *H04L 12/823* | (2013.01) |
| *H04L 12/841* | (2013.01) |
| *H04L 12/801* | (2013.01) |

(52) U.S. Cl.
CPC ...... *H04L 47/2483* (2013.01); *H04L 12/4645* (2013.01); *H04L 47/16* (2013.01); *H04L 47/28* (2013.01); *H04L 47/32* (2013.01); *H04L 12/4641* (2013.01)

(58) Field of Classification Search
CPC . H04L 47/2483; H04L 12/4645; H04L 47/32; H04L 47/28; H04L 47/16; H04L 12/4641; H04L 47/11; H04L 47/2441
See application file for complete search history.

(56) References Cited

U.S. PATENT DOCUMENTS

| | | | |
|---|---|---|---|
| 2013/0070778 A1* | 3/2013 | Eberle | H04L 47/621 370/412 |
| 2017/0118100 A1* | 4/2017 | Xu | H04L 41/14 |
| 2017/0310695 A1* | 10/2017 | Vasseur | H04L 43/12 |

FOREIGN PATENT DOCUMENTS

JP   2014-165819 A   9/2014

* cited by examiner

*Primary Examiner* — Ashley Shivers
(74) *Attorney, Agent, or Firm* — Mattingly & Malur, PC

(57) ABSTRACT

A communication device: stores flow condition information for identifying a flow and flow counter information that indicates, for each flow, an input flow volume of a flow inputted to the communication device, and an output flow volume of a flow outputted by the communication device; identifies a flow to which data inputted to the communication device belongs, with reference to the flow condition information; updates the input flow volume of the flow in the flow counter information; identifies a flow to which data outputted by the communication device belongs, with reference to the flow condition information; updates the output flow volume of the flow in the flow counter information; and identifies a flow in which a communication anomaly has occurred on the basis of results of a comparison process for comparing the input flow volume to the output flow volume with reference to the flow counter information.

11 Claims, 11 Drawing Sheets

| FLOW CONDITION [1601] | INPUT OBSERVATION TARGET DEVICE [1602] | OUTPUT OBSERVATION TARGET DEVICE [1603] | FLOW PASSAGE DEVICE [1604] | | |
|---|---|---|---|---|---|
| FLOW CONDITION 1 | DEVICE 1 | DEVICE 3 | DEVICE 1 | DEVICE 2 | DEVICE 3 ... |
| FLOW CONDITION 2 | DEVICE 1 | DEVICE 3 | DEVICE 1 | DEVICE 2 | DEVICE 3 ... |
| ... | ... | ... | ... | ... | ... ... |

*FIG. 11*

COMMUNICATION DEVICE, COMMUNICATION SYSTEM, AND COMMUNICATION METHOD

CLAIM OF PRIORITY

The present application claims priority from Japanese patent application JP 2018-39031 filed on Mar. 5, 2018, the content of which is hereby incorporated by reference into this application.

BACKGROUND OF THE INVENTION

The present invention relates to a communication device, a communication system, and a communication method.

Communication packets are transmitted among a plurality of terminals using a packet relay device that relays communication packets on the internet or a corporate network, and a network constituted of a plurality of packet relay devices. If a fault were to occur in a packet relay device, communication between terminals is disabled, and in order to restore communication, functions of some or all of the packet relay devices are stopped and communication is restarted using other packet relay devices.

A technique for detecting a fault in a packet relay device is disclosed in JP 2014-165819 A (Patent Document 1). This publication states (see abstract): "In inputting frames to an observation interval inside an NPU reception unit 32, an input statistical information generation unit 50 generates input statistical information pertaining to the number of input frames inputted into the observation interval, and an input statistic information insertion unit 60 inserts the information into the frame. In outputting a frame from the observation interval, an input statistical information extraction unit 62 extracts input statistical information from the frame, and an output statistical information generation unit 52 generates output statistical information pertaining to the number of output frames outputted from the observation interval. A comparison unit 64 compares the input statistical information extracted by the input statistical information extraction unit 62 to the output statistical information generated by the output statistical information generation unit 52, thereby detecting anomalies in the observation interval."

SUMMARY OF THE INVENTION

In the technique disclosed in Patent Document 1, anomalies are detected by comparing the number of input frames to the number of output frames, but if a fault occurs in which the output destination is erroneous, for example, then the number of input frames would be the same as the number of output frames, preventing detection of the anomaly.

In order to detect anomalies resulting from such faults, it is necessary to identify the flow in which the communication anomaly has occurred. An object of one aspect of the present invention is to identify the flow in which a communication anomaly has occurred.

In order to solve the above problems, an aspect of the present invention adopts the following structures. A communication device that forwards data, comprises: flow condition information for identifying a flow that is data having a common attribute; flow counter information that indicates, for each flow, an input flow volume of a flow inputted to the communication device, and an output flow volume of a flow outputted by the communication device; an input flow counter processing unit that identifies a flow to which data inputted to the communication device belongs, with reference to the flow condition information, and updates the input flow volume of the flow in the flow counter information; an output flow counter processing unit that identifies a flow to which data outputted by the communication device belongs, with reference to the flow condition information, and updates the output flow volume of the flow in the flow counter information; and a counter comparison unit that identifies a flow in which a communication anomaly has occurred on the basis of results of a comparison process for comparing the input flow volume to the output flow volume with reference to the flow counter information.

An aspect of the present invention can identify the flow in which a communication anomaly has occurred. The problems, configurations, and effects other than those described above become apparent by the descriptions of embodiments below.

BRIEF DESCRIPTIONS OF DRAWINGS

The present invention can be appreciated by the description which follows in conjunction with the following figures, wherein:

FIG. 11 shows a configuration example of a flow management information table of Embodiment 3;

DETAILED DESCRIPTION OF EMBODIMENTS

Figure 1:
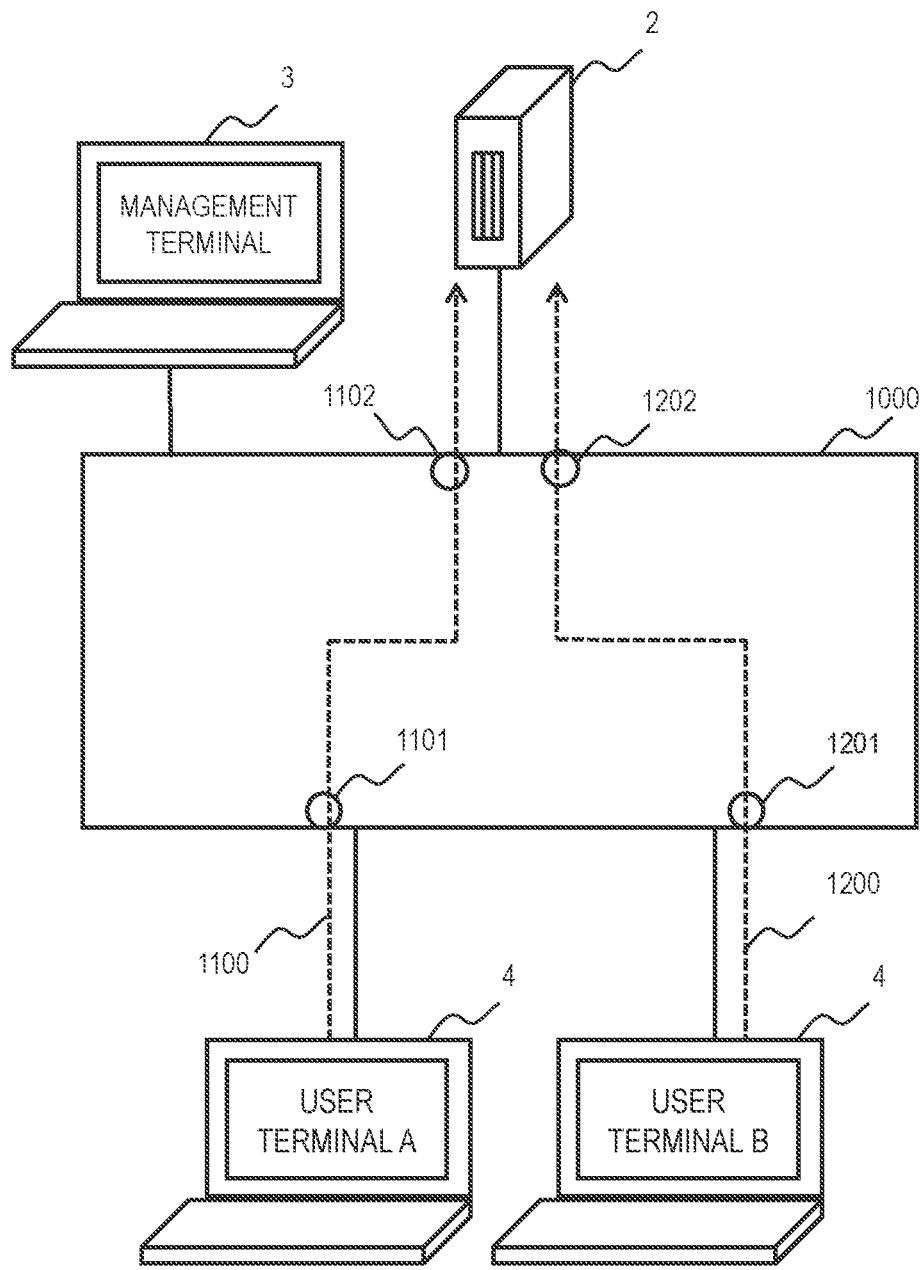
FIG. 1 is a block diagram that shows a configuration example of a packet relay system of Embodiment 1.

Embodiments of the present invention will be explained below with reference to attached drawings. The embodiments are merely an example for realizing the present invention, and it should be noted that the embodiments do not limit the technical scope of the present invention. The same reference characters are assigned to common components in the respective drawings.

In packet relay devices, there are sometimes faults in which only specific packets are discarded. An example will be described of a packet relay device in which the VLAN is determined by a VLAN ID in a VLAN tag defined in IEEE (Institute of Electrical and Electronics Engineers) 802.1Q, only packets belonging to the same VLAN are outputted to an output port belonging to the VLAN, and packets having set thereto a VLAN ID value that is not already set in the packet relay device are discarded.

The packet relay device retains in memory a table that stores, for each VLAN ID, a state indicating that a VLAN ID is set for a device (below, VLAN active state). Upon receipt of a packet, the packet relay device reads the table, and if the packet is in a VLAN active state, then processing of the packet continues, and if the packet is in a VLAN inactive state, then the packet is discarded. In such a case, if a fault occurs in the memory in which a given VLAN ID is read as being in a VLAN inactive state even though it is in a VLAN active state, the packet set for the given VLAN ID is erroneously discarded.

If such a situation were to occur, it is necessary to identify the erroneously discarded packet. Also, it is necessary to identify the flow indicated by input source information such as the transmission source terminal of the erroneously discarded packet, and output destination information such as the destination terminal. The aforementioned Patent Document 1 does not mention identification of a flow.

Also, it is necessary to detect the occurrence of faults such as an erroneous output destination for a packet. In the case of a fault in which a circuit that reads a memory that stores the output destination of the packet and assigns an address malfunctions and the output destination of another packet is read, the technique disclosed in Patent Document 1 detects anomalies by comparing the number of input frames to the number of output frames, and thus, even if a fault were to occur in which the output destination is erroneous, the number of input frames would be the same as the number of output frames, preventing detection of the anomaly.

In dealing with this issue, the packet relay device of the present embodiments executes a comparison process for comparing the input flow volume to the output flow volume, thereby enabling identification of a flow in which a communication anomaly is occurring, and solving the above-mentioned problem.

Embodiment 1

FIG. 1 is a block diagram that shows a configuration example of the packet relay system of the present embodiment. The packet relay system includes a packet relay device 1000, a server 2, a management terminal 3, and a plurality of user terminals 4. In the example of FIG. 1, the packet relay system includes two user terminals 4, with one user terminal 4 being assigned an identifier of A, and the other user terminal 4 being assigned an identifier of B.

The packet relay device 1000 is an example of a communication device and relays packets from a given device to another device. The packet relay device 1000 processes and monitors packet communication (flow 1100) from the user terminal 4 with the identifier A to the server 2, and packet communication (flow 1200) from the user terminal 4 with the identifier B to the server 2. A flow is a group of packets having common attributes. In the present embodiment, an example will be described in which a packet, as an example of data, is processed, but the item to be processed may be data other than packets (such as frames and segments, for example).

The packet relay device 1000 uses an input counter 1101 to count and store the accumulated total number of packets or the accumulated total number of bytes inputted as the flow 1100. Also, the packet relay device 1000 uses an output counter 1102 to count and store the accumulated total number of packets or the accumulated total number of bytes outputted from the packet relay device 1000 as the flow 1100. The packet relay device 1000 compares the input counter 1101 to the output counter 1102, and determines whether communication of the flow 1100 is in a normal state.

Also, the packet relay device 1000 uses an input counter 1201 to count and store the accumulated total number of packets or the accumulated total number of bytes inputted as the flow 1200. The packet relay device 1000 uses an output counter 1202 to count and store the accumulated total number of packets or the accumulated total number of bytes outputted from the packet relay device 1000 as the flow 1200. The packet relay device 1000 compares the input counter 1201 to the output counter 1202, and determines whether communication of the flow 1200 is in a normal state.

The server 2, the management terminal 3, and the user terminals 4 are all computers that include a CPU (processor), a memory, an auxiliary storage device, input devices such as a mouse and keyboard, an output device such as a display, and a communication interface, for example.

The server 2 is connected to the packet relay device 1000 and provides prescribed services according to requests from the user terminals 4. The management terminal 3 is connected to a device control unit 1001 (to be mentioned later) of the packet relay device 1000, and manages the packet relay device 1000. The management terminal 3 receives a setting command for the packet relay device 1000 from a manager, for example, and transmits the command to the device control unit 1001. Also, the management terminal 3 receives and displays notifications from the packet relay device 1000, for example.

The user terminals 4 are connected to the packet relay device 1000 and issue requests for prescribed services to the server 2, and are provided services from the server 2 corresponding to the requests. In the example of FIG. 1, the devices are connected to each other directly by wires, but may alternatively be wirelessly connected.

Figure 2:
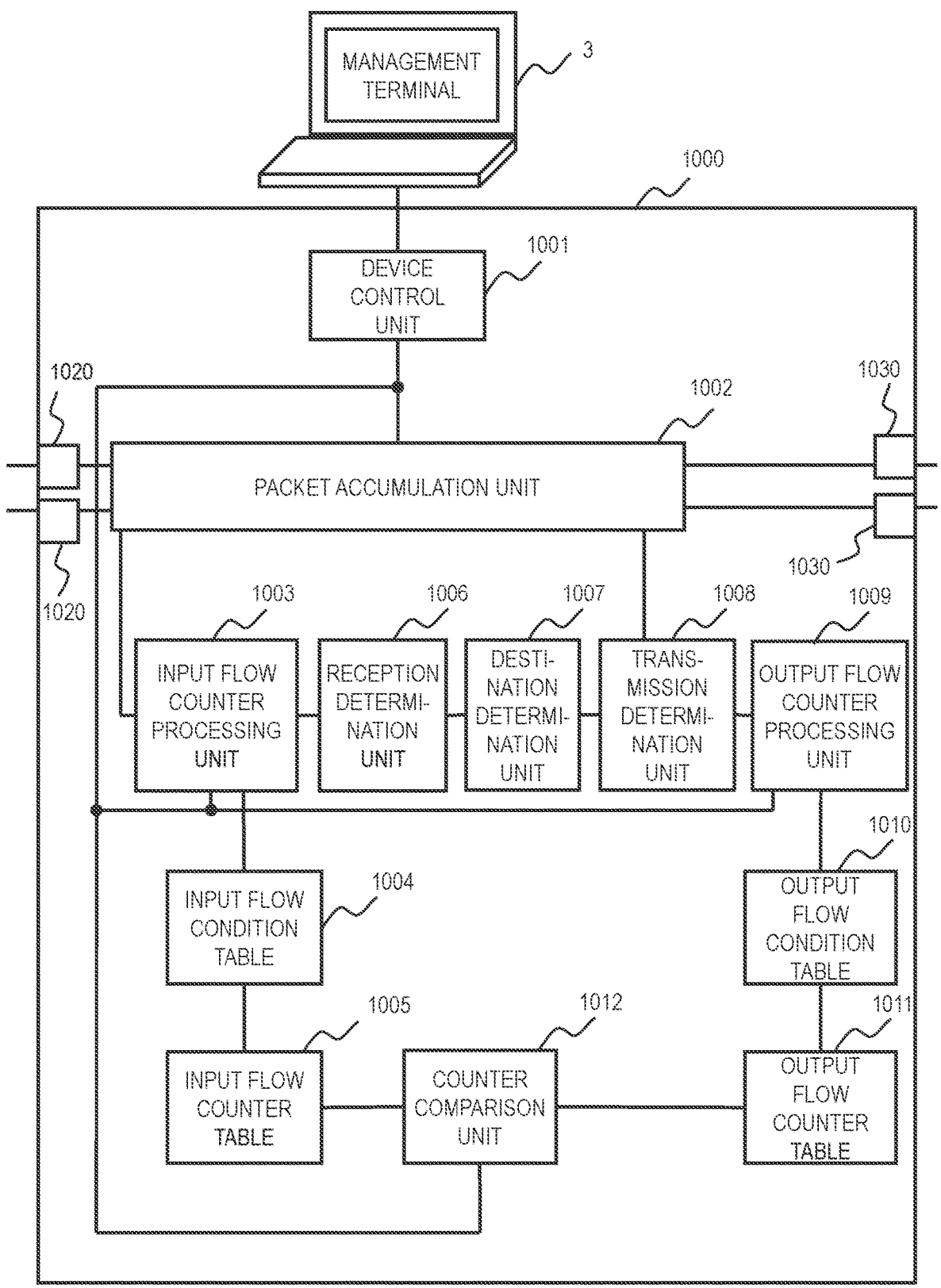
FIG. 2 is a block diagram that shows a configuration example of a packet relay device of Embodiment 1.

FIG. 2 is a block diagram that shows a configuration example of the packet relay device 1000 of the present embodiment. The packet relay device 1000 includes, for example, a plurality of input ports 1020, a plurality of output ports 1030, the device control unit 1001, a packet accumulation unit 1002, an input flow counter processing unit 1003, an input flow condition table 1004, an input flow counter table 1005, a reception determination unit 1006, a destination determination unit 1007, a transmission determination unit 1008, an output flow counter processing unit 1009, an output flow condition table 1010, an output flow counter table 1011, and a counter comparison unit 1012.

The components included in the packet relay device 1000 are each constituted of a circuit such as an ASIC (application-specific integrated circuit) or an FPGA (field-programmable gate array). Each table is stored in a memory retained in the packet relay device 1000, for example. Each component included in the packet relay device 1000 may be realized by software. In other words, the packet relay device 1000 includes a CPU (processor) and a memory, and the components may be realized by operating the CPU according to programs stored in the memory.

The device control unit 1001 makes various settings in the packet relay device 1000 on the basis of setting commands or the like received from the management terminal 3. The input port 1020 receives a packet from an input line connected thereto, and transmits the packet to a packet accumulation unit 1002. The output port 1030 receives the packet from the packet accumulation unit 1002 and transmits the packet to an output line connected thereto.

The packet accumulation unit 1002 accumulates packets received from the input port 1020. Also, the packet accumulation unit 1002 extracts header information from the received packets and issues the header information to the input flow counter processing unit 1003.

The input flow counter processing unit 1003 issues the packet header information to the reception determination unit 1006. Also, the input flow counter processing unit 1003 identifies the input counter on the basis of the input flow condition table 1004 and updates the counter value of the input flow counter table 1005. The reception determination unit 1006 determines reception determination information (information indicating passage or discarding of packets) on the basis of the header information, and transmits the header information and reception determination information to the destination determination unit 1007.

The destination determination unit 1007 determines output information such as the output port and the output VLAN information of the packet on the basis of the header information, and transmits the header information, the reception determination information, and the destination information to the transmission determination unit 1008. The transmission determination unit 1008 determines transmission determination information (information indicating passage or discarding of packets) on the basis of the header information. The transmission determination unit 1008 determines whether to allow through or discard packets on the basis of the reception determination information and/or the transmission determination information, and issues this determination together with destination information to the packet accumulation unit 1002 and the output flow counter processing unit 1009.

The packet accumulation unit 1002 assigns necessary information to the packet on the basis of the output port, the output VLAN information, and the like indicated by the destination information, and outputs the packet to the output port. The output flow counter processing unit 1009 identifies the output counter on the basis of the output flow condition table 1010 and updates the counter value of the output flow counter table 1011.

The input flow condition table 1004 is a table for the input flow counter processing unit 1003 to determine the corresponding counter according to flow conditions. The input flow counter table 1005 stores the counter value of each input counter (total accumulated number of packets and total accumulated number of bytes, for example). The output flow condition table 1010 is a table for the output flow counter processing unit 1009 to determine the corresponding counter according to flow conditions. The output flow counter table 1011 stores the counter value of each output counter (total accumulated number of packets and total accumulated number of bytes, for example).

Figure 3:
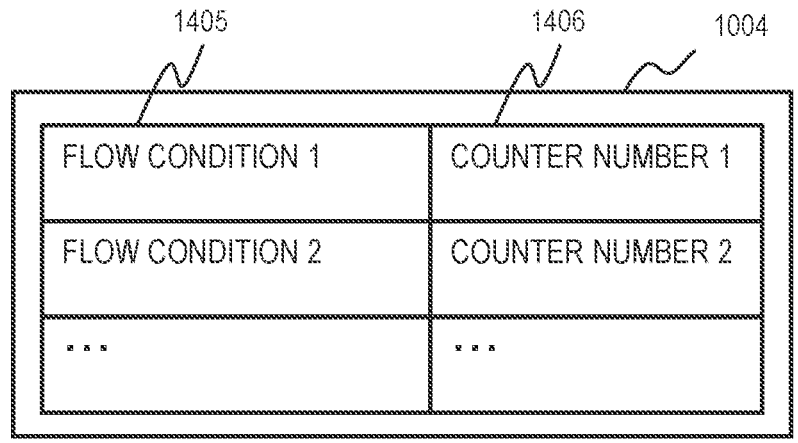
FIG. 3 shows a configuration example of an input flow condition table of Embodiment 1.

FIG. 3 shows a configuration example of the input flow condition table 1004. The configuration of the output flow condition table 1010 is similar to that of the input flow condition table 1004, and thus, only the input flow condition table 1004 will be described here.

The input flow condition table 1004 includes a flow condition column 1405 and a counter number column 1406, for example. The flow condition column 1405 stores flow conditions. All flow conditions stored in the input flow condition table 1004 are also stored in the output flow condition table 1010. The flow conditions in the flow condition column 1405 may be determined such that each packet has only one flow condition associated therewith, or the flow conditions in the flow condition column 1405 may be determined such that each packet has a plurality of flow conditions associated therewith.

The counter number column 1406 stores the number (identifier) of the counter that counts the flow volume of the flow identified by the corresponding flow conditions. In the example of FIG. 3, the flow condition 1 corresponds to the counter number 1 and the flow condition 2 corresponds to the counter number 2.

The flow condition is information that identifies the flow. The flow condition is expressed as a combination of a plurality of pieces of information including the packet header information, input line number, output line number, VLAN identification information determined on the basis of the foregoing information, and the like.

The packet header information includes fields such as a destination MAC (media access control) address, a transmission source MAC address, and a VLAN ID, which constitute header information of an Ethernet (registered trademark; same below) frame, as well as a destination IP address, a transmission source IP address, an upper layer protocol, a TCP (transfer control protocol) destination port number, and a transmission source port number, which constitute IP (internet protocol) packet header information.

The input flow condition table 1004 is not limited to the configuration shown in FIG. 3. For example, a configuration may be adopted in which the flow conditions are constituted of a CAM (content-addressable memory) with the counter number being stored in RAM (random access memory) so as to correspond one-to-one with an address.

Figure 4:
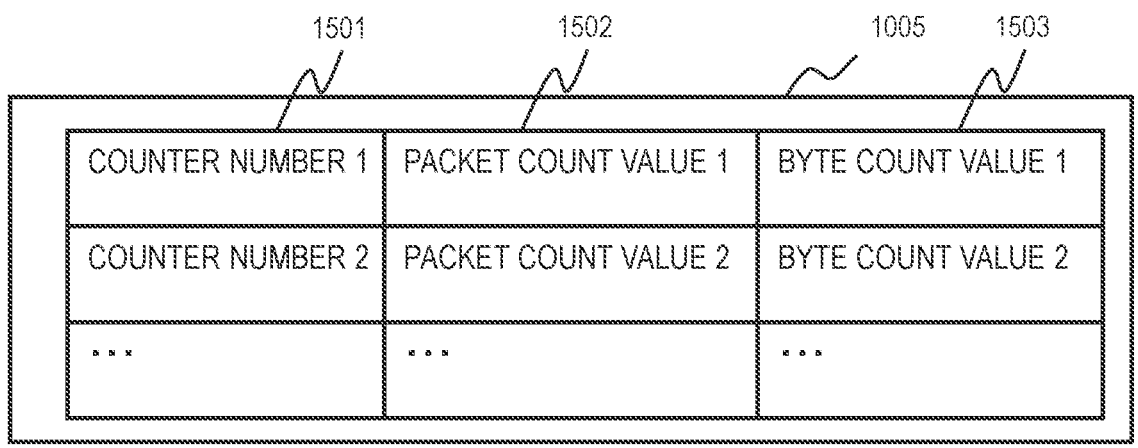
FIG. 4 shows a configuration example of an input flow counter table of Embodiment 1.

FIG. 4 shows a configuration example of the input flow counter table 1005. The configuration of the output flow counter table 1011 is similar to that of the input flow counter table 1005, and thus, only the input flow counter table 1005 will be described here.

The input flow counter table 1005 includes a counter number column 1501, a packet count value column 1502, and a byte count value column 1503, for example. The counter number column 1501 stores the counter number. The packet count value column 1502 stores the number of packets counted by a counter with a corresponding counter number. The byte count value column 1503 stores the number of bytes counted by a counter with a corresponding counter number.

The input flow counter table 1005 may alternatively include only either one of the packet count value column 1502 and the byte count value column 1503. The input flow counter table 1005 may store a value other than the packet count and the byte count as long as the value indicates the flow volume (total data volume including header information of the packet belonging to the flow).

Figure 5:
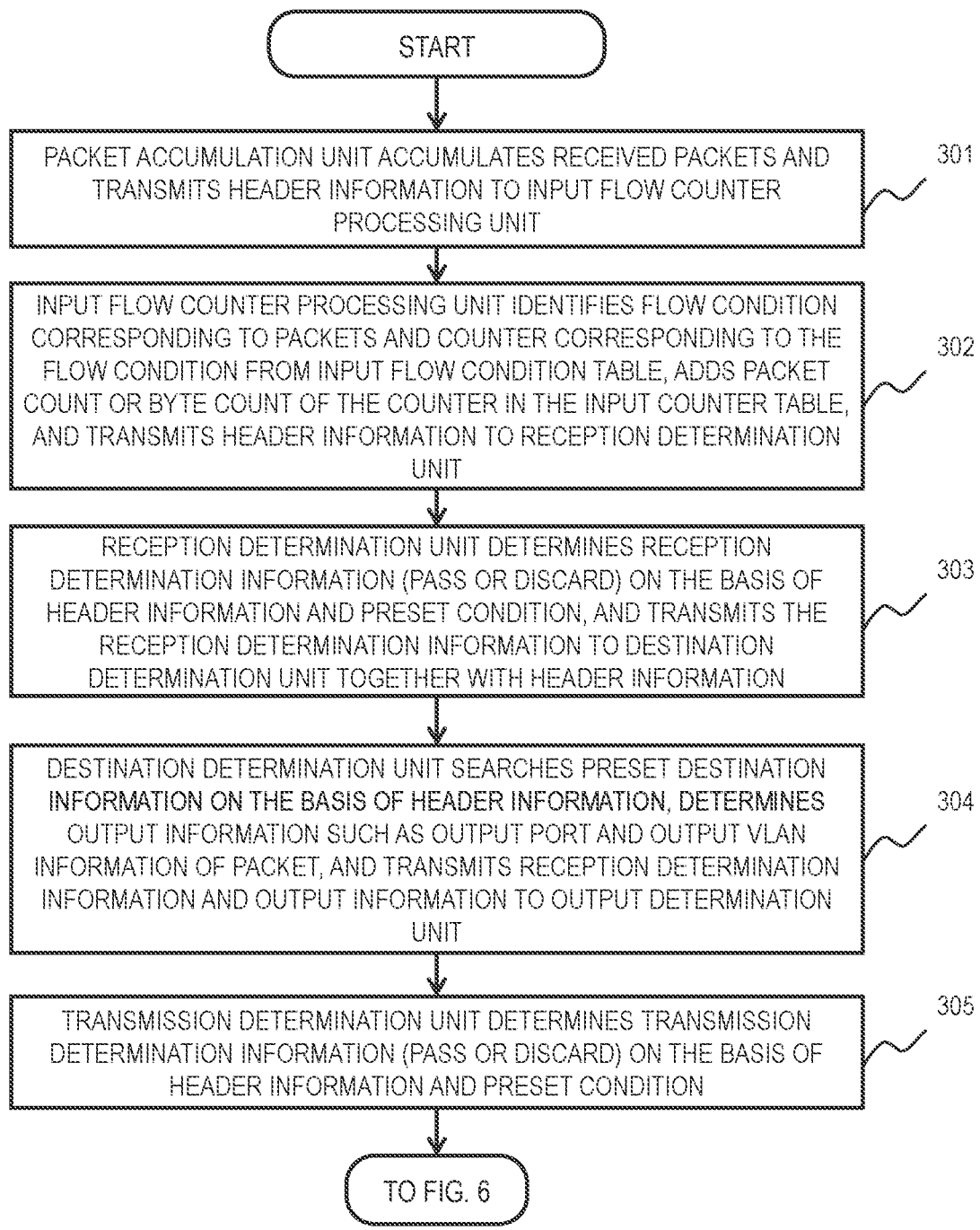
FIG. 5 is a flowchart that shows an example of a packet forwarding process in Embodiment 1.
Figure 6:
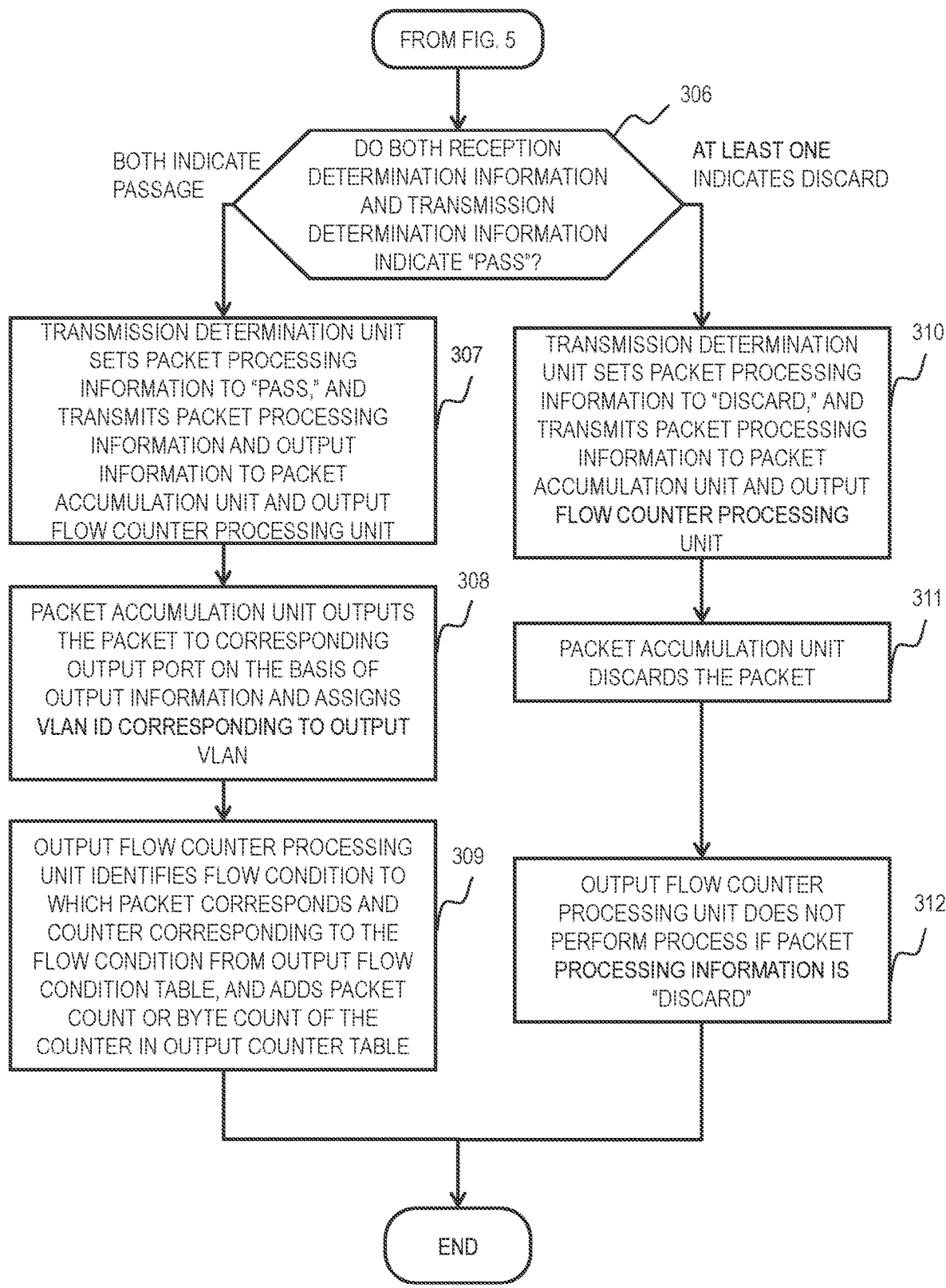
FIG. 6 is a flowchart that shows an example of a packet forwarding process in Embodiment 1.

FIGS. 5 and 6 are flowcharts showing an example of a packet forwarding process. The packet forwarding process starts by being triggered by the packet relay device 1000 receiving a packet from any of the input ports 1020.

The packet accumulation unit 1002 accumulates packets received from the port in memory, extracts the header information and byte count from the packet, determines the packet count to be 1, and transmits the extracted information and the packet count to the input flow counter processing unit 1003 (step 301). If flow conditions including information other than header information (input line number, output line number, VLAN identification information, etc., for example) are set, the packet accumulation unit 1002 transmits the foregoing information in addition to the header information to the input flow counter processing unit 1003. Below, an example will be described in which the flow condition only includes header information.

The input flow counter processing unit 1003 uses the header information received from the packet accumulation unit 1002 as a search key to search the input flow condition table 1004, identifies a flow condition corresponding to the search key, and identifies a counter number corresponding to the identified flow condition (step 302).

Also, in step 302, the input flow counter processing unit 1003 uses the identified counter number as a search key to search the input flow counter table 1005, and adds the values of the packet count value column 1502 and the byte count value column 1503 corresponding to a matching counter number. Then, in step 302, the input flow counter processing unit 1003 issues the header information to the reception determination unit 1006.

The reception determination unit 1006 determines the reception determination information on the basis of one or more pieces of prescribed header information, for example (step 303). The reception determination information indicates whether to allow through or discard the packet. The reception determination unit 1006 has set in advance therein correspondence information including the prescribed header information value and the reception determination information, and the reception determination unit 1006 determines the reception determination information on the basis of the correspondence information, for example. Also, in step 303, the reception determination unit 1006 transmits reception determination information and the header information received from the input flow counter processing unit 1003 to the destination determination unit 1007.

The destination determination unit 1007 determines the output information on the basis of one or more pieces of prescribed header information, for example (step 304). The destination determination unit 1007 has set in advance therein destination information indicating the correspondence between the prescribed header information value, and output information such as the output port and the output VLAN information of the packet, and the destination determination unit 1007 determines the destination information on the basis of the correspondence information, for example. Also, in step 304, the destination determination unit 1007 transmits reception determination information and the determined output information to the transmission determination unit 1008.

The transmission determination unit 1008 determines the transmission determination information on the basis of one or more pieces of prescribed header information, for example (step 305). The transmission determination information indicates whether to allow through or discard the packet. The transmission determination unit 1008 has set in advance therein correspondence information including the prescribed header information value and the transmission determination information, and the transmission determination unit 1008 determines the transmission determination information on the basis of the correspondence information. If the reception determination information is set to "discard," the transmission determination unit 1008 may automatically set the transmission determination information to "discard" or not execute the determination process for the transmission determination information.

The transmission determination unit 1008 verifies the reception determination information and the transmission determination information (step 306). If the transmission determination unit 1008 determines that both the reception determination information and the transmission determination information indicate that the packet should be allowed through, then the process progresses to step 307. If the transmission determination unit 1008 determines that at least one of the reception determination information and the transmission determination information indicates that the packet should be discarded, then the process progresses to step 310.

If the transmission determination unit 1008 has determined in step 306 that both the reception determination information and the transmission determination information indicate that the packet should be allowed through, the packet processing information is set to "pass," and the packet processing information and the output information are transmitted to the packet accumulation unit 1002 and the output flow counter processing unit 1009 (step 307).

Next, if the packet accumulation unit 1002 determines that the packet processing information is set to "pass," it then outputs the packet to the corresponding output port 1030 on the basis of the output information (step 308). Also, in step 308, the packet accumulation unit 1002 assigns to the packet a VLAN ID corresponding to the output VLAN of the packet on the basis of the output information.

Next, if the output flow counter processing unit 1009 determines that the packet processing information is set to "pass," it then uses the header information of the packet as a search key to search the output flow condition table 1010, identifies a flow condition corresponding to the search key, and identifies a counter number corresponding to the identified flow condition (step 309). Also, in step 309, the output flow counter processing unit 1009 uses the identified counter number as a search key to search the output flow counter table 1011, and adds the values of the packet count value column 1502 and the byte count value column 1503 to a counter corresponding to a matching counter number.

If the transmission determination unit 1008 has determined in step 306 that at least one of the reception determination information and the transmission determination information indicates that the packet should be discarded, the packet processing information is set to "discard," and the packet processing information is transmitted to the packet accumulation unit 1002 and the output flow counter processing unit 1009 (step 310). In this case, the transmission determination unit 1008 need not transmit the packet processing information to the output flow counter processing unit 1009.

Next, if the packet accumulation unit 1002 determines that the packet processing information is set to "discard," it then discards the packet (step 311). If the packet processing information is set to "discard," then the output flow counter processing unit 1009 need not perform its process (step 312).

If the transmission determination unit 1008 determines in step 306 that at least one of the reception determination information and the transmission determination information indicates that the packet should be allowed through, then the process may progress to step 307, and if both indicate that the packet should be discarded then the process may progress to step 310.

Figure 7:
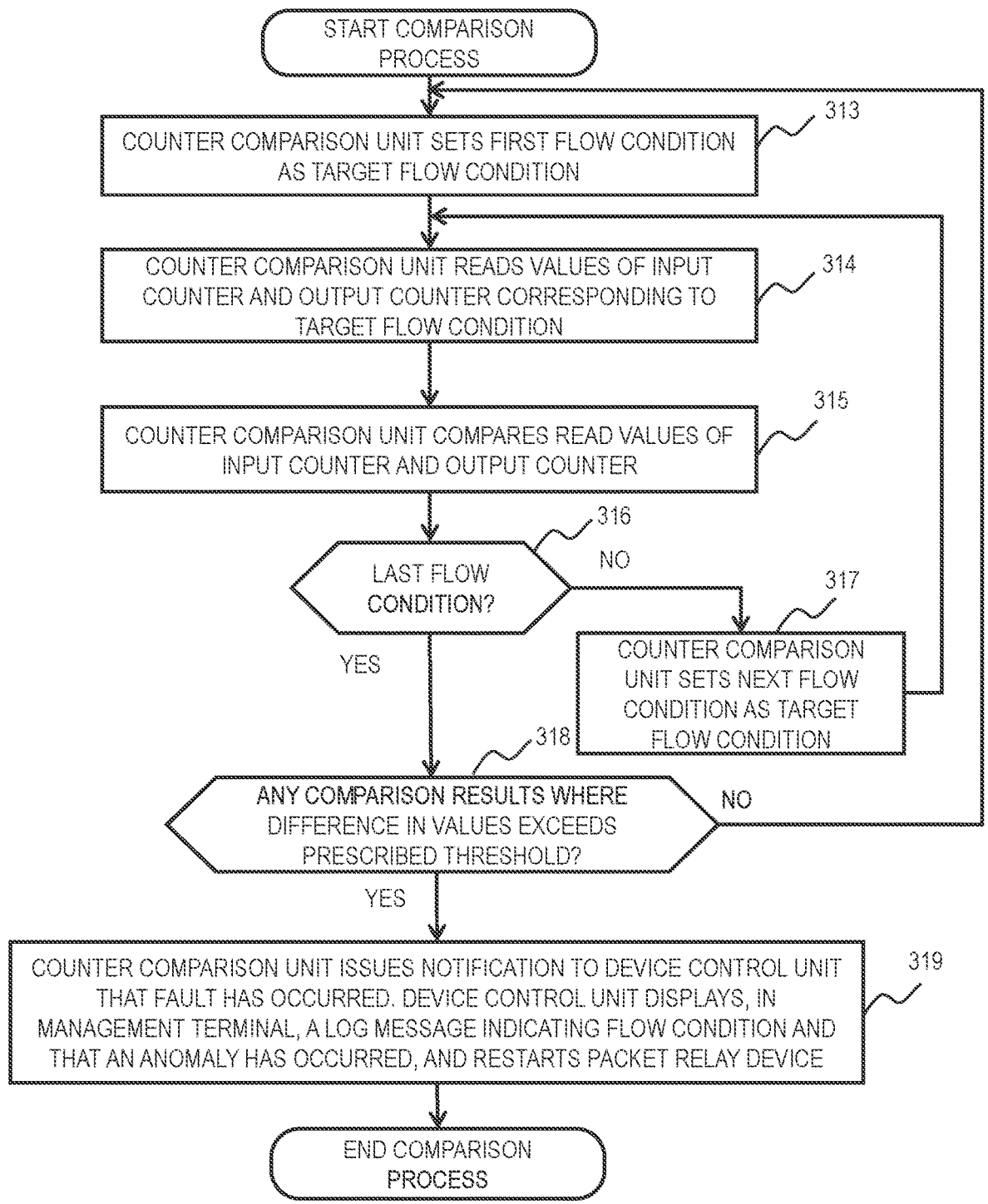
FIG. 7 is a flowchart that shows an example of a comparison process between an input flow counter and an output flow counter in Embodiment 1.

FIG. 7 is a flowchart showing one example of a comparison process between an input flow counter and an output flow counter. The comparison process is started by the counter comparison unit 1012 every given period of time (from the end of the previous comparison process to after a prescribed time has elapsed, for example). The counter comparison unit 1012 sets the initial flow condition of the input flow condition table 1004 (flow condition 1 in the example of FIG. 3) as the target flow condition (step 313).

The counter comparison unit 1012 reads values of the input counter and the output counter corresponding to the target flow condition (step 314). Specifically, the counter comparison unit 1012 identifies the counter number corresponding to the target flow condition in the input flow condition table 1004, and reads the packet count value or byte count value corresponding to the counter number in the input flow counter table 1005 as the input counter value.

Similarly, the counter comparison unit 1012 identifies the counter number corresponding to the target flow condition in the output flow condition table 1010, and reads the packet count value or byte count value (same value types as input counter value) corresponding to the counter number in the output flow counter table 1011 as the output counter value.

Next, the counter comparison unit 1012 compares values of the read in input counter and output counter (step 315). Specifically, for example, the counter comparison unit 1012 calculates the difference between the values of the read in input counter and output counter.

Next, the counter comparison unit 1012 determines whether the target flow condition is the last flow condition of the input flow condition table 1004 (step 316). If it is determined in step 316 that the target flow condition is not the last flow condition, then the counter comparison unit 1012 sets the next flow condition in the input flow condition table 1004 as the target flow condition (step 317) and returns to step 314.

If it is determined in step 316 that the target flow condition is the last flow condition, then the counter comparison unit 1012 progresses to step 318. The counter comparison unit 1012 determines whether, among the comparison results in step 315, there are comparison results where the difference in value between the input counter and the output counter exceeds a prescribed threshold (step 318). If it is determined in step 318 that there are no comparison results where the difference in value between the input counter and the output counter exceeds the prescribed threshold, then the counter comparison unit 1012 returns to step 313.

If it is determined in step 318 that there are comparison results where the difference in value between the input counter and the output counter exceeds the prescribed threshold, the counter comparison unit 1012 determines that a fault has occurred, and issues a notification to the device control unit 1001 that a fault has occurred and includes in the notification the flow condition of the comparison result where the difference in value between the counters has exceeded the prescribed threshold (step 319). Also, in step 319, the device control unit 1001, which received the notification, displays in a display device or the like of the management terminal 3 the received notification including the flow condition and that an anomaly has occurred as a log message. Additionally, in step 319, the device control unit 1001 restarts the packet relay device 1000.

The counter comparison unit 1012 may determine in step 315 whether there are comparison results where the difference in value between the counters exceeds a prescribed threshold. In such a case, if it is determined that the difference exceeds the prescribed threshold, then the counter comparison unit 1012 may progress to step 319 without comparing the counter values for the remaining flow conditions of the input flow condition table 1004. In the example above, as long as no fault occurs, the comparison process is not ended, but the comparison process may be ended according to commands or the like issued by a manager through the management terminal 3, for example.

As described above, the packet relay device 1000 can identify a flow in which communication has been prevented as a result of a fault in the packet relay device 1000 by comparing the value of the input counter to the value of the output counter.

The packet relay device 1000 may detect malfunctions resulting from a fault such as an erroneous output destination for the packet by the following method. First, the output flow condition table 1010 further retains output destination information corresponding to each flow condition.

In step 309 when processing packets, the output flow counter processing unit 1009 updates the counter value corresponding to a given flow condition in the output flow counter table 1011 only if it is determined that the output destination information corresponding to the flow condition in the output flow condition table 1010 matches the output information in the notification from the transmission determination unit 1008.

By such a process being performed, if a fault in which the output destination is erroneous occurs, the counter values of the output flow counter table 1011 are not updated, and thus, the difference value from comparison with the counter value of the input flow counter table 1005 increases, which enables the packet relay device 1000 to detect an anomaly.

When changing the output destination due to a change in configuration of the network, it is preferable that the packet relay device 1000 not execute the comparison process until new output destination information is recorded in the output flow condition table 1010 so that the packet relay device 1000 does not falsely detect an anomaly.

The flow condition set in the input flow condition table 1004 or the like is set in advance by a manager or the like of the packet relay device 1000. Also, the packet relay device 1000 may set flow conditions in these tables when receiving packets.

Specifically, for example, if in step 302 a search of the input flow condition table 1004 yields the result that there is no flow condition to which the packet belongs, then the input flow counter processing unit 1003 determines that a packet belonging to a new flow has been received and generates a flow condition corresponding to the flow. Furthermore, the input flow counter processing unit 1003 sets the flow condition and the counter number for the counter that counts the packets in the flow in the input flow condition table 1004 and sets the counter number in the input flow counter table 1005. In generating a flow condition, the input flow counter processing unit 1003 generates a new flow condition according to the header information, port information of the device, VLAN identification information, and the like, which were set in advance by a manager or the like of the packet relay device 1000.

The setting process for the new flow condition and the counter number in the output flow condition table 1010 and the setting process for the counter number in the output flow condition table 1010 are performed in step 309 by a similar method by the output flow counter processing unit 1009, for example.

The flow conditions differ depending on the observation policy of the manager of the packet relay device 1000. If, for example, the VLAN and the user terminal 4 correspond one-to-one, the flow condition may include VLAN identification information in order to monitor communications for each user terminal 4. Also, in order to monitor communications of the user terminals 4 for each communication protocol, the flow condition may include a combination of an IP address and protocol information of the user terminals 4.

Also, the packet relay device 1000 has a configuration enabling it to handle a plurality of protocols such as IP, MPLS, and Ethernet, and if the combination of flow conditions for performing observation differ for each protocol, a different flow condition may be set for each protocol in the input flow condition table 1004 and the output flow condition table 1010. If the circuit configuration of the input flow counter processing unit 1003 and the output flow counter processing unit 1009 is realized by including a reconfigurable FPGA, then it is preferable that the flow condition tables be searched using differing flow conditions for the respective protocols. It is assumed that the length of the header in the header information used in the flow condition differs for each protocol, and thus, it is possible to perform the flow counter process using minimal hardware resources for each protocol.

In the above example, the comparison process is performed at a given time interval, but the packet relay device 1000 may perform the comparison process every time it receives a packet, for example. Specifically, when forwarding packets, the value of the input flow counter may be sequentially issued as a notification from the input flow counter 1003 to the reception determination unit 1006, the destination determination unit 1007, and the transmission determination unit 1008 at the same time as the header information and the like, with the output flow counter processing unit 1009 comparing the value of the input flow counter to the value of the output counter. In this case, a separate packet process is not performed between adding up the total for the input flow counter and adding up the total for the output flow counter, which presents the advantage that the difference between counter values is eliminated and the accuracy of anomaly detection in communications is improved.

If during the comparison process, the value of the input counter and the value of the output counter are read at different times from the input flow counter table 1005 and the output flow counter table 1011, respectively, and the packet process is performed between those times, for example, a difference in counter values would occur even if there is no anomaly in communication of the flow. Thus, the prescribed threshold in step 318 needs to be set to a large enough value that such a difference between counter values would not be erroneously detected as a communication anomaly.

Also, even for normal communications, there are cases in which the counter values of the input flow and the output flow do not correspond one-to-one but correspond one-to-n (n being a natural number). Specifically, there are cases in which multicast communication is performed in which the packet accumulation unit 1002 copies a plurality (n) of packets to the output destination. In this example, when performing normal communication, if the counter value of the input flow counter for multicasting is "a," then the output flow counter after copying is "n" times "a."

In the case of multicast communications, the difference in counter values resulting from the aforementioned time difference in reading the counter values is also "n"-fold, and thus, the device control unit 1001 dynamically determines the threshold at step 318 according to the number of multicast copies, for example. In other words, if the number of multicast copies changes, the device control unit 1001 updates the threshold according to the changed number of multicast copies. Alternatively, a configuration may be adopted in which the threshold is not changed, but rather, in step 315, the counter comparison unit 1012 performs comparison in a state where the input counter value is set to a large value (n times, for example) or a state in which the output counter value is set to a small value (1/n times, for example) according to the number of multicast copies.

An example was described in which, in step 317, the packet relay device 1000 is restarted, but a configuration may be adopted in which the manager sets in advance whether or not to restart the packet relay device 1000. For example, if the manager chooses the setting of "do not restart packet relay device," then in step 317 the packet relay device 1000 is not restarted.

Embodiment 2

Figure 8:
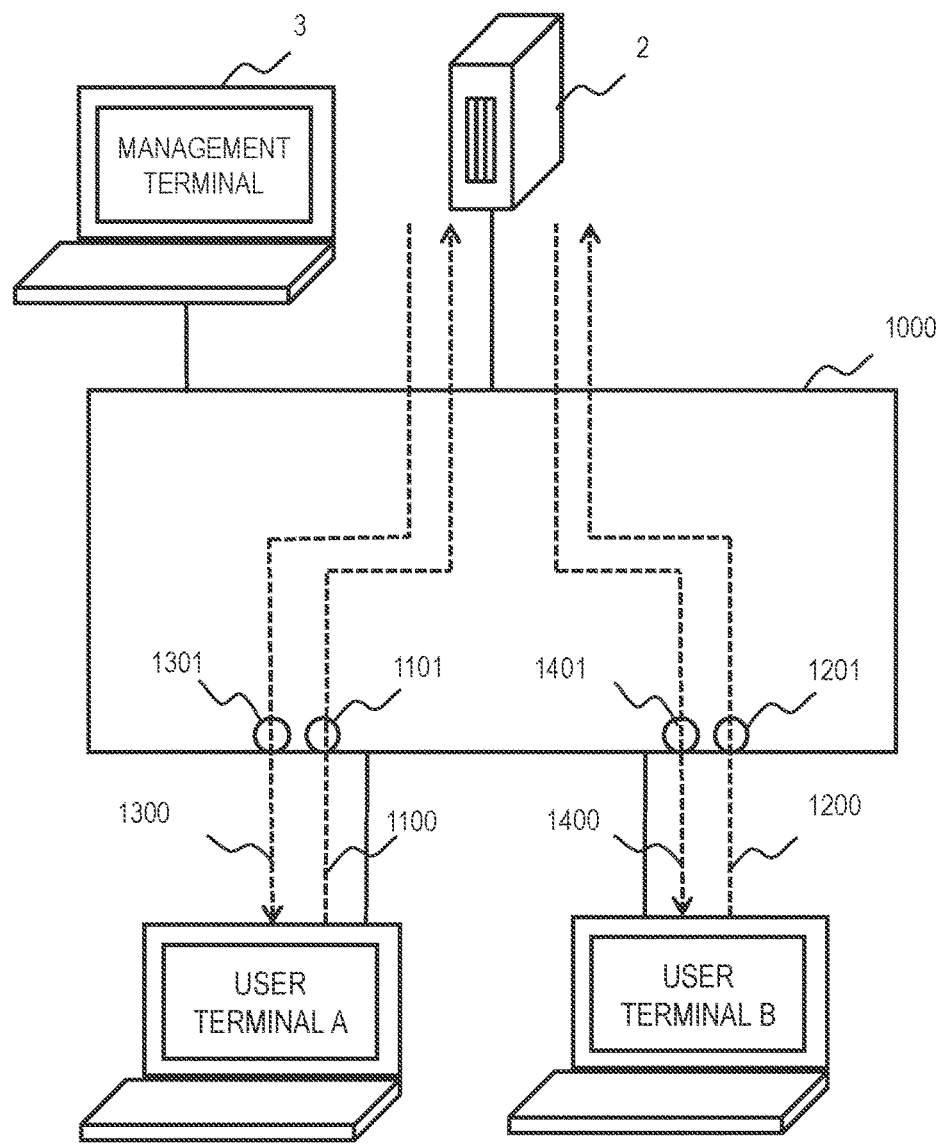
FIG. 8 is a block diagram that shows a configuration example of the packet relay system of Embodiment 2.

FIG. 8 is a block diagram that shows a configuration example of the packet relay system of the present embodiment. Differences from Embodiment 1 will be described. The packet relay device 1000 additionally processes and monitors packet communication (flow 1300) from the server 2 to a user terminal 4 with an identifier of A, and packet communication (flow 1400) from the server 2 to a user terminal 4 with an identifier of B.

The packet relay device 1000 has an output counter 1301 and an output counter 1401. The packet relay device 1000 uses the output counter 1301 to count and store the accumulated total number of packets or the accumulated total number of bytes outputted from the packet relay device 1000 to the user terminal 4 having the identifier of A, as the flow 1300. Also, the packet relay device 1000 uses the output counter 1402 to count and store the accumulated total number of packets or the accumulated total number of bytes outputted from the packet relay device 1000 to the user terminal 4 having the identifier of B, as the flow 1400.

The packet relay device 1000 compares the input counter 1101 to the output counter 1301, and determines whether communication of the flow 1100 and the flow 1300 is in a normal state. Also, the packet relay device 1000 compares the input counter 1201 to the output counter 1401, and determines whether communication of the flow 1200 and the flow 1400 is in a normal state. In the present embodiment, the counter comparison unit 1012 has a comparison flow management table 1500 to be mentioned later.

Communication between the user terminals 4 and the server 2 typically happens bidirectionally. If, for example, data from the server 2 is read by the user terminal 4, packets transmitted from the user terminal 4 to the server 2 are packets having instructions regarding the type of data to be read, and thus, the total amount of data in the packet including the header information is less than the total amount of data in the packet including the header information transmitted from the server 2 to the user terminal 4 (that is, packet including main body of data to be read). Thus, the number of packets from the user terminal 4 to the server 2 and the number of packets from the server 2 to the user terminal 4 are in a one-to-n (n being a real number of 1 or greater) relationship.

The packet relay device 1000 periodically monitors the relationship between the flow volume from the user terminal 4 with the identifier of A to the server 2, and the flow volume from the server 2 to the user terminal 4 with the identifier of A, thereby learning the value of n, for example.

Specifically, for example, every prescribed period, the device control unit 1001 acquires a flow volume X during the prescribed period from the server 2 to the user terminal 4 having the identifier of A, and a flow volume Y during the prescribed period from the user terminal 4 having the identifier of A to the server 2, from the input flow counter processing unit 1003 and the output flow counter processing unit 1009, respectively. The device control unit 1001 determines the value n when performing communication between the user terminal 4 with the identifier of A and the server 2 to be a value of X divided by Y (or a value attained by adding or subtracting a prescribed margin to/from this value), and notifies the counter comparison unit 1012 of the value n. In some cases, there are time periods during which there are no data requests from the user terminal 4 to the server 2, there are time differences between a data request from the user terminal 4 to the server 2 and a data request from the server 2 to the user terminal 4, and the like, and thus, it is preferable that the prescribed time be relatively long (on a scale of hours as opposed to seconds (approximately one hour, for example)). Also, if the device control unit 1001 determines that the value of n greatly differs depending on the time period (difference between maximum value of n and minimum value of n is at a prescribed value or greater, or the quotient of the maximum value of n divided by the minimum value of n is a prescribed value or greater, etc.), then the value of n may be determined for each time period. In such a case, during the comparison process, determination may be performed using the value of "n" determined for each time period.

Also, even during the prescribed period, the flow counter value is recorded in the input flow counter table 1005 and the output flow counter table 1011, but it is preferable that the prescribed period for determining the value of n and the period for determining whether the communication of the flow 1200 and the flow 1400 is happening normally differ from each other (and not overlap). This is because if these periods were the same, then any anomalies in the communication of the flow 1200 and the flow 1400 would not be detected.

In step 315, the counter comparison unit 1012 performs comparison in a state where the input counter value is set to a large value (n times, for example) or a state in which the output counter value is set to a small value (1/n times, for example).

Figure 9:
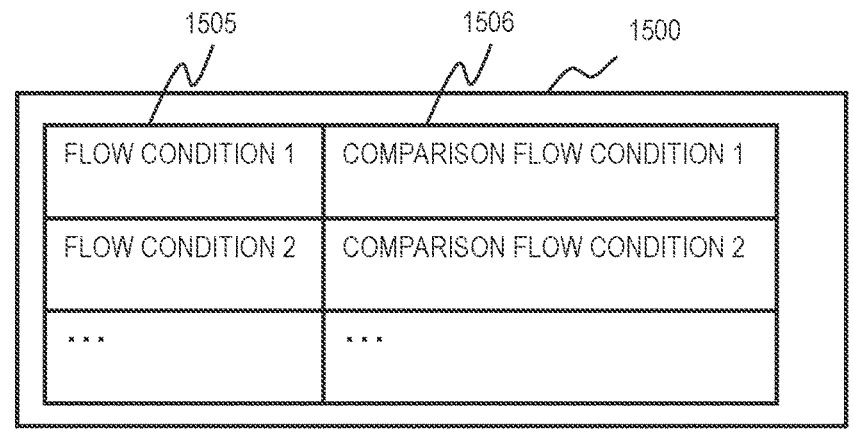
FIG. 9 shows a configuration example of a comparison flow management table of Embodiment 2.

FIG. 9 shows a configuration example of the comparison flow management table 1500. The comparison flow management table 1500 includes a flow condition column 1505 and a comparison flow condition column 1506, for example. The flow condition column 1505 stores flow conditions. The comparison flow condition column 1506 stores comparison flow conditions corresponding to the flow conditions.

In the present embodiment, in step 314, the counter comparison unit 1012 identifies a flow condition that matches a target flow condition from the flow condition column 1505 of the comparison flow management table 1500, and extracts a comparison flow condition corresponding to the flow condition identified from the comparison flow condition column 1506. In the example of FIG. 8, in the comparison flow management table 1500, the flow condition indicating the flow 1300 serves as the comparison flow condition for comparison with the flow condition indicating the flow 1100, and the flow condition indicating the flow 1400 serves as the comparison flow condition for comparison with the flow condition indicating the flow 1200.

In step 314, the counter comparison unit 1012 acquires a counter number corresponding to the target flow condition from the input flow condition table 1004, acquires the counter number corresponding to the extracted comparison flow condition from the output flow condition table 1010, and reads the counter values. In step 315, the counter comparison unit 1012 compares the counter values corresponding to the counter numbers.

The values set in the input flow condition table 1004 are set in advance by a manager or the like of the packet relay device 1000, for example. Also, the packet relay device 1000 itself may determine the values inside the comparison flow management table 1500.

Specifically, when the packet relay device 1000 receives packets for when communication from the user terminal 4 having the identifier of A to the server 2 has started, the flow condition of the flow 1100 and the flow condition of the flow 1300 are learned on the basis of the header information set in advance by the manager of the packet relay device 1000, port information of the packet relay device 1000, VLAN identification information, and the like, and values to be stored in the comparison flow management table 1500 are determined.

The device control unit 1001 receives, from the input flow counter processing unit 1003, the header information, the port information, the VLAN identification information, and the like of the inputted packet. If the destination IP address of the packet of the first flow matches the transmission source IP address of the second flow, and the transmission source IP address of the packet of the first flow matches the destination IP address of the second flow, for example, then it is decided in advance that the flow condition indicating the second flow is determined to be the comparison flow condition for comparison with the flow condition indicating the first flow.

In such a case, in the example of FIG. 8, the device control unit 1001 can determine according to the header information of the flow 1100 and the flow 1300 that the destination IP address of the packet of the flow 1100 matches the transmission source IP address of the packet of the flow 1300, and the transmission source IP address of the packet of the flow 1100 matches the destination IP address of the packet of the flow 1300. As a result, the device control unit 1001 can determine the comparison flow condition corresponding to the flow condition indicating the flow 1100 to be the flow condition indicating the flow 1300.

According to the aforementioned configuration, the packet relay device 1000 of the present embodiment can detect anomalies in communication if there is a downlink communication flow corresponding to the uplink communication flow. Also, the packet relay device 1000 of the present embodiment can find communication anomalies using a counter at one of two devices for which packets are to be relayed (user terminal 4 in the example of FIG. 8).

[Embodiment 3]

Figure 10:
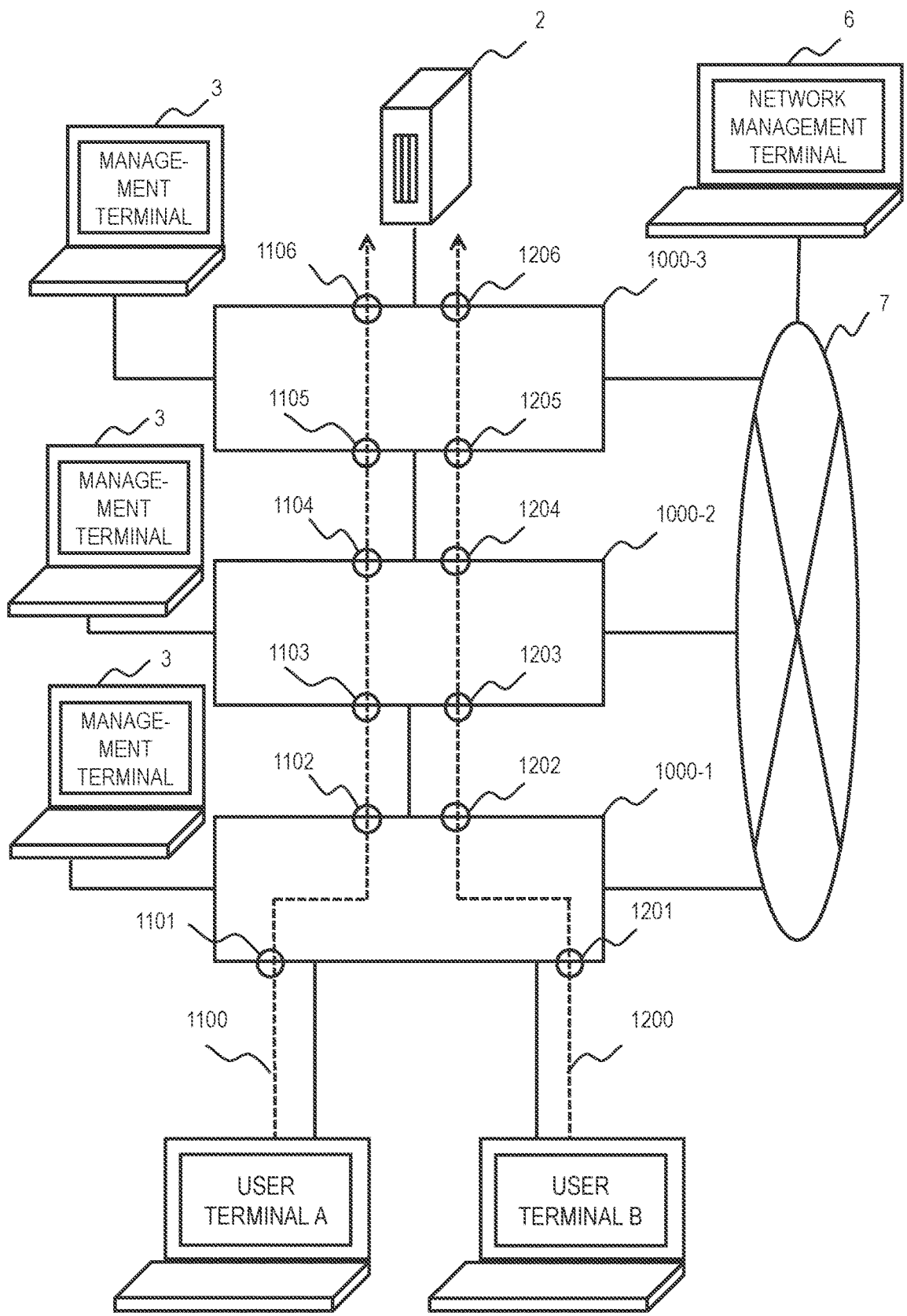
FIG. 10 is a block diagram that shows a configuration example of the packet relay system of Embodiment 3.

Differences from Embodiment 1 will be described. FIG. 10 is a block diagram that shows a configuration example of the packet relay system of the present embodiment. Differences from Embodiment 1 will be described. The packet relay system of the present embodiment includes a plurality of packet relay devices 1000. In the example of FIG. 10, the packet relay system includes three packet relay devices 1000-1 to 1000-3. If there is no need to distinguish among the packet relay devices 1000-1 to 1000-3, they are simply referred to as packet relay devices 1000.

The packet relay devices 1000 are connected to a management network 7. Also, the packet relay system includes a network management terminal 6, which is a computer that manages and monitors the packet relay devices 1000-1 to 1000-3 through the management network 7. The network management terminal 6 is a computer that includes a CPU (processor), a memory, an auxiliary storage device, input devices such as a mouse and keyboard, an output device such as a display, and a communication interface, for example. The network management terminal 6 retains a flow management information table 1600 to be mentioned later.

The user terminals 4 are all connected to the packet relay device 1000-1 and the server 2 is connected to the packet relay device 1000-3 by wired connection, for example. The packet relay device 1000-1 is connected to the packet relay device 1000-2, and the packet relay device 1000-2 is connected to the packet relay device 1000-3 by wired connection, for example.

The packet relay device 1000-1 has an input counter 1101, an input counter 1201, an output counter 1102, and an output counter 1202. The packet relay device 1000-2 has an input counter 1103, an input counter 1203, an output counter 1104, and an output counter 1204. The packet relay device 1000-3 has an input counter 1105, an input counter 1205, an output counter 1106, and an output counter 1206.

The flow 1100 from the user terminal 4 with an identifier of A to the server 2 passes through the packet relay device 1000-1, the packet relay device 1000-2, and the packet relay device 1000-3, in the stated order. In this case, the input counter 1101 and the output counter 1102 of the packet relay device 1000-1, the input counter 1103 and the output counter 1104 of the packet relay device 1000-2, and the input counter 1105 and the output counter 1106 of the packet relay device 1000-3 are all updated.

Also, the flow 1200 from the user terminal 4 with an identifier of B to the server 2 similarly passes through the packet relay device 1000-1, the packet relay device 1000-2, and the packet relay device 1000-3, in the stated order. In this case, the input counter 1201 and the output counter 1202 of the packet relay device 1000-1, the input counter 1203 and the output counter 1204 of the packet relay device 1000-2, and the input counter 1205 and the output counter 1206 of the packet relay device 1000-3 are all updated.

FIG. 11 shows a configuration example of the flow management information table 1600. The flow management information table 1600 is a table for controlling the observation of the flow. The flow management information table 1600 includes a flow condition column 1601, an input observation target device column 1602, an output observation target device column 1603, and a flow passage device column 1604. The flow condition column 1601 stores flow conditions stored in the input flow condition table 1004 and the output flow condition table 1010.

The input observation target device column 1602 stores an identifier of the packet relay device 1000 to which the flow indicating the corresponding flow condition is first inputted, from among the plurality of packet relay devices 1000-1 to 1000-3. The output observation target device column 1603 stores an identifier of the packet relay device 1000 to which the flow indicating the corresponding flow condition is last outputted, from among the plurality of packet relay devices 1000-1 to 1000-3.

The identifier of the packet relay device 1000-1 is stored in the input observation target device column 1602 corresponding to the flow conditions of the flow 1100 and the flow 1200, respectively, in the example of FIG. 10. Also, the identifier of the packet relay device 1000-3 is stored in the output observation target device column 1603 corresponding to the flow conditions of the flow 1100 and the flow 1200, respectively.

The flow passage device column 1604 stores the identifiers of the packet relay devices 1000 through which the flows indicated by the corresponding flow conditions pass, in the order that the flows pass through or an inspection order (a priority level that is determined for a device, for example; the priority may differ depending on the flow) determined by a policy set by a manager or the like For example, the identifiers of the packet relay device 1000-1, the packet relay device 1000-2, and the packet relay device 1000-3 are stored in the input flow passage device column 1604 corresponding to the flow conditions of the flow 1100 and the flow 1200, respectively, in the example of FIG. 10.

Figure 12:
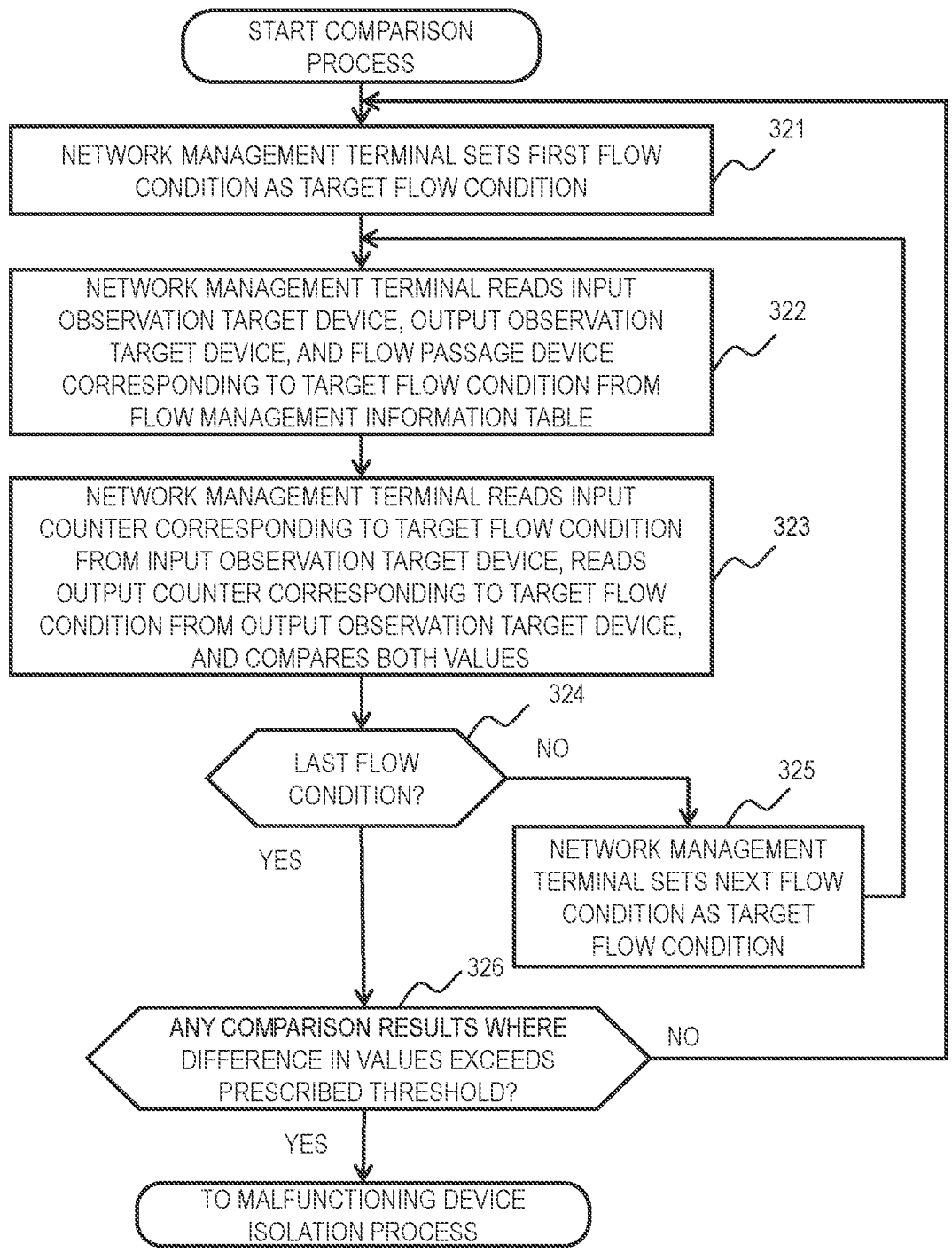
FIG. 12 is a flowchart that shows an example of a comparison process for each network in Embodiment 3.
Figure 13:
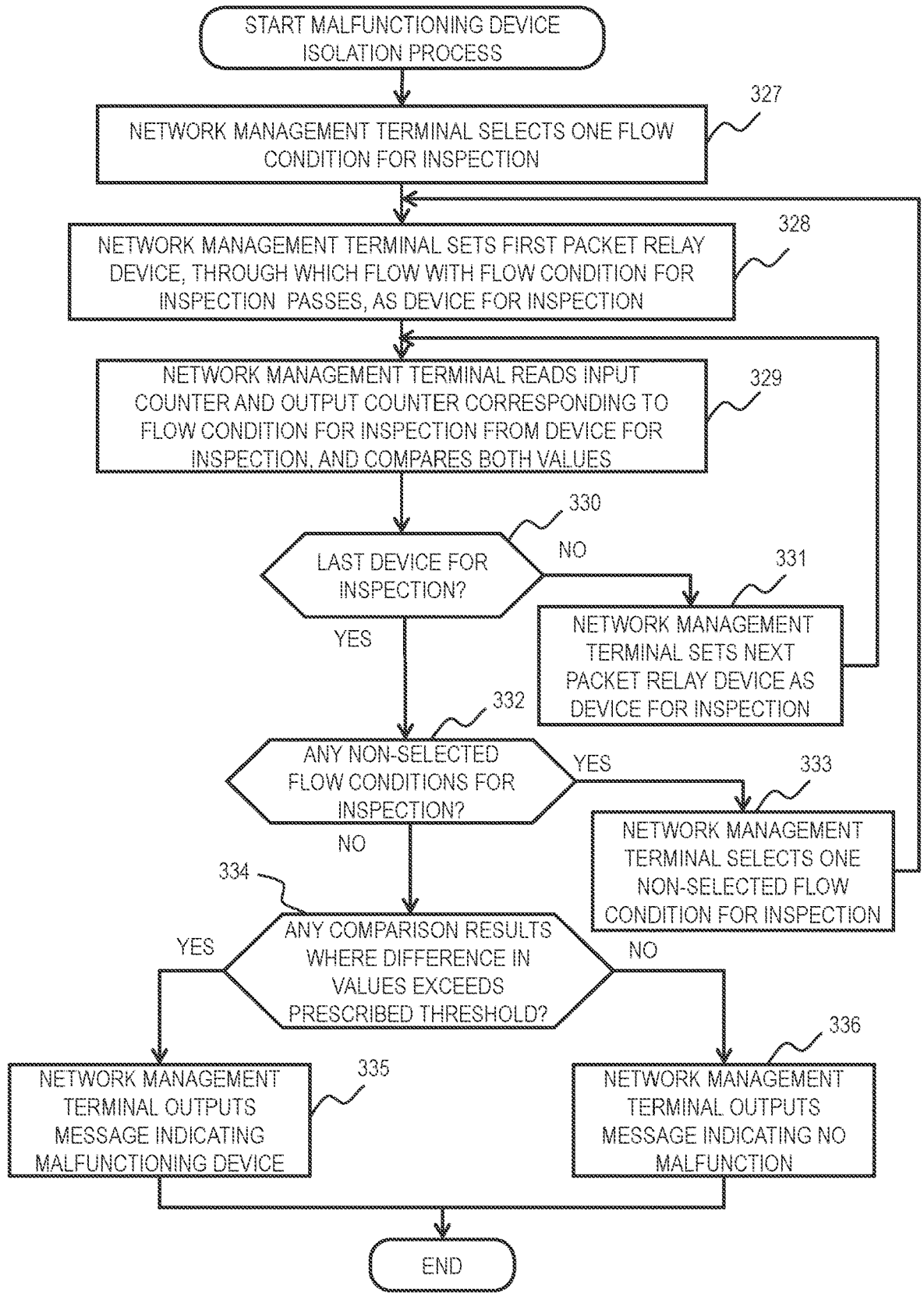
FIG. 13 is a flowchart that shows an example of a malfunctioning device isolation process in Embodiment 3.

FIG. 12 is a flowchart showing an example of a comparison process for each network in the present embodiment. FIG. 13 is a flowchart showing an example of a malfunctioning device isolation process.

The start trigger for the comparison process is similar to Embodiment 1, but the determiner of the start trigger is the network management terminal 6. The network management terminal 6 sets the initial flow condition of the flow management information table 1600 (flow condition 1 in the example of FIG. 11) as the target flow condition (step 321). The network management terminal 6 reads, from the flow management information table 1600, the input observation target device, the output observation target device, and the flow passage device corresponding to the flow condition (step 322).

The network management terminal 6 reads a value of the input counter from the input observation target device and reads the value of the output counter from the output observation target device through the management network 7, and compares these values (step 323). Specifically, in step 323, the network management terminal 6 identifies the counter number corresponding to the target flow condition in the input flow condition table 1004 of the packet relay device 1000 that is the input observation target device, and reads the packet count value or byte count value corresponding to the counter number in the input flow counter table 1005 as the input counter value.

Similarly, in step 323, the network management terminal 6 identifies the counter number corresponding to the target flow condition in the output flow condition table 1010 of the packet relay device 1000 that is the input observation target device, and reads the packet count value or byte count value (same value types as input counter value) corresponding to the counter number in the output flow counter table 1011 as the output counter value.

Also, in step 323, the network management terminal 6 calculates the difference between the values of the read in input counter and output counter in order to compare the values of the input counter and output counter.

Next, the network management terminal 6 determines whether the target flow condition is the last flow condition of the flow management information table 1600 (step 324). If it is determined in step 324 that the target flow condition is not the last flow condition, then the network management terminal 6 sets the next flow condition in the flow management information table 1600 as the target flow condition (step 325) and returns to step 322.

If it is determined in step 324 that the target flow condition is the last flow condition, then the network management terminal 6 progresses to step 326. The network management terminal 6 determines whether, among the comparison results in step 323, there are comparison results where the difference in value between the input counter and the output counter exceeds a prescribed threshold (step 326). If it is determined in step 326 that there are no comparison results where the difference in value between the input counter and the output counter exceeds the prescribed threshold, then the network management terminal 6 returns to step 321.

If, in step 326, it is determined that there is a comparison result where the difference in value between the input counter and the output counter exceeds the prescribed threshold, then the network management terminal 6 determines the flow condition in the comparison result to be a flow condition for inspection, and the process progresses to an isolation process.

Next, the isolation process will be described. The network management terminal 6 selects one flow condition for inspection (step 327). The first packet relay device 1000 among the flow passage devices corresponding to the selected flow condition for inspection in the flow management information table 1600 is determined to be the device for inspection (step 328).

The network management terminal 6 reads values of the input counter and the output counter from the device for inspection through the management network 7, and compares these values (step 329).

Specifically, in step 329, the network management terminal 6 identifies the counter number corresponding to the selected flow condition for inspection in the input flow condition table 1004 of the device for inspection, and reads the packet count value or byte count value corresponding to the counter number in the input flow counter table 1005 as the input counter value.

Additionally, in step 329, the network management terminal 6 identifies the counter number corresponding to the selected flow condition for inspection in the output flow condition table 1010 of the device for inspection through the management network 7, and reads the packet count value or byte count value corresponding to the counter number in the output flow counter table 1011 as the output counter value.

Also, in step 328, the network management terminal 6 calculates the difference between the values of the read in input counter and output counter in order to compare the values of the input counter and output counter.

Next, the network management terminal 6 determines whether the device for inspection is the last packet relay device 1000 among the flow passage devices corresponding to the selected flow condition for inspection in the flow management information table 1600 (step 330). In step 330, if the network management terminal 6 determines that the device for inspection is not the last packet relay device 1000, the network management terminal determines the next packet relay device 1000 among the flow passage devices corresponding to the selected flow condition for inspection in the flow management information table 1600 to be the device for inspection (step 331), and then returns to step 329.

In step 330, if the network management terminal 6 determines that the device for inspection is the last packet relay device 1000, the network management terminal determines whether there are non-selected flow conditions for inspection (step 332). If it is determined in step 332 that there are non-selected flow conditions for inspection, then the network management terminal 6 selects one of the non-selected flow conditions for inspection and returns to step 328.

If the network management terminal 6 determines in step 332 that there are no non-selected flow conditions for inspection, the network management terminal determines whether, among the comparison results in step 329, there are comparison results where the difference in value between the input counter and the output counter exceeds a prescribed threshold (step 334).

If it is determined in step 334 that there are no comparison results where the difference in value between the input counter and the output counter exceeds the prescribed threshold, then the network management terminal 6 outputs a message indicating that there is no fault to a display device or the like of the network management terminal 6, for example (step 336), and ends the malfunctioning device isolation process. In such a case, the network management terminal 6 need not execute step 336. Also, in this case or after execution of step 336, the process may return to step 321.

Additionally, in this case, the network management terminal 6 may output the flow condition for inspection, the device for inspection corresponding to the flow condition for inspection, and the like to a display device or the like of the network management terminal 6. As a result, even if there were no major anomaly in each individual item for inspection, the manager could be notified of an anomaly that has an overall effect on the devices for inspection.

If it is determined in step 334 that there are comparison results where the difference in value between the input counter and the output counter exceeds the prescribed threshold, then the network management terminal 6 outputs a message indicating the malfunctioning device (that is, the device for inspection in the comparison results) to a display device or the like of the network management terminal 6, for example (step 337), and ends the malfunctioning device isolation process. The network management terminal 6 may include in the message not only the malfunctioning device but also a flow condition to be inspected that corresponds to the comparison results, and a device to be inspected, other than the malfunctioning device, corresponding to the flow to be inspected. If the message is outputted, the network manager isolates the malfunctioning device.

The network management terminal 6 may determine in step 329 whether there are comparison results where the difference in value between the counters exceeds the prescribed threshold. In such a case, if it is determined that the difference exceeds the prescribed threshold, then the network management terminal 6 may progress to step 335 without comparing the counter values for the remaining devices for inspection. In the example above, as long as no fault occurs, the comparison process is not ended, but the network management terminal 6 may end the comparison process according to commands or the like issued by a manager, for example.

The values set in the flow management information table 1600 are set in advance by a manager or the like of the network management terminal 6 on the basis of configuration information of the observation network, for example. Also, the network management terminal 6 itself may generate the flow management information table 1600.

Specifically, for example, when each packet relay device 1000 learns a flow condition, it issues the flow condition to the network management terminal 6 through the management network 7. As a result, the network management terminal 6 can learn the flow condition and the input observation target device, the output observation target device, and the flow passage device corresponding to the flow condition. Also, as a result, the network management terminal 6 can automatically update the flow management information table 1600 even if the network configuration is modified.

The network management terminal 6 itself generating the flow management information table 1600 by learning poses the advantage that there is no need for a manager of the network management terminal 6 to generate the flow management information table 1600.

The packet relay system of the present embodiment can identify the flow in which a communication anomaly has occurred and the packet relay device 1000 that is the source of the anomaly by the aforementioned configurations and processes.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A communication device that forwards data, comprising:
   flow condition information for identifying a flow that is data having a common attribute;
   flow counter information that indicates, for each flow, an input flow volume of a flow inputted to the communication device, and an output flow volume of a flow outputted by the communication device;
   an input flow counter processing unit that identifies a flow to which data inputted to the communication device belongs, with reference to the flow condition information, and updates the input flow volume of the flow in the flow counter information;
   an output flow counter processing unit that identifies a flow to which data outputted by the communication device belongs, with reference to the flow condition information, and updates the output flow volume of the flow in the flow counter information; and
   a counter comparison unit that identifies a flow in which a communication anomaly has occurred on the basis of results of a comparison process for comparing the input flow volume to the output flow volume with reference to the flow counter information.

2. The communication device according to claim 1, wherein the attribute includes at least one of header information, input port information, output port information, and VLAN information of the data.

3. The communication device according to claim 1, wherein at least either one of the input flow counter processing unit and the output flow counter processing unit includes an FPGA (field-programmable gate array), and
   wherein said at least one of the input flow counter processing unit and the output flow counter processing unit self-reconfigures on the basis of the flow indicated by the flow condition.

4. The communication device according to claim 1, wherein, if data that does not belong to the flow defined in the flow condition information is inputted to the communication device, the input flow counter processing unit extracts a prescribed type of attribute from the data and sets the data having the extracted attribute to the flow condition information as a new flow.

5. The communication device according to claim 1, wherein the inputted data is copied and outputted to a plurality of devices, and
   wherein the counter comparison unit performs the comparison on the basis of a number of copies during the comparison process.

6. The communication device according to claim 1, wherein the counter comparison unit compares the input flow volume and the output flow volume of the same flow during the comparison process.

7. The communication device according to claim 1, further comprising:
   comparison flow management information that indicates a correspondence between the input flow and the output flow being compared during the comparison process,
   wherein, during the comparison process, the counter comparison unit compares the input flow volume of the input flow indicated by the comparison flow management information to the output flow volume of the output flow corresponding to the input flow in the flow counter information.

8. The communication device according to claim 7, wherein, in the comparison flow management information, a correspondence between a first input flow indicating data transmission from a first device to a second device, and a first output flow indicating data transmission from the second device to the first device is defined, and
   wherein, during the comparison process, the counter comparison unit performs comparison on the basis of a ratio between a flow volume of the first input flow inputted to the communication device and an output flow volume of the first output flow outputted from the communication device during a prescribed past period.

9. A communication system, comprising:
   a plurality of communication devices that forward data; and
   a management device that manages the plurality of communication devices,
   wherein each of the plurality of communication devices includes:
   flow condition information for identifying a flow that is data having a common attribute;
   flow counter information that indicates, for each flow, an input flow volume of a flow inputted to the communication device, and an output flow volume of a flow outputted by the communication device;
   an input flow counter processing unit that identifies a flow to which data inputted to the communication device belongs, with reference to the flow condition information, and updates the input flow volume of the flow in the flow counter information; and
   an output flow counter processing unit that identifies a flow to which data outputted by the communication device belongs, with reference to the flow condition information, and updates the output flow volume of the flow in the flow counter information, and
   wherein the management device
   retains flow management information that indicates, for each flow, an input communication device to which the flow is first inputted, an output communication device that outputs the flow last, and a flow passage communication device through which the flow passes,
   acquires, from the input communication device corresponding to the flow indicated by the flow management information, an input flow volume corresponding to the flow in the flow counter information, acquires, from the output communication device corresponding to the flow indicated by the flow management information, an output flow volume corresponding to the flow in the flow counter information, determines whether an anomaly has occurred in communication of the flow on the basis of results of a first comparison process for comparing the acquired input flow volume to the acquired output flow volume, acquires, from each malfunctioning communication device candidate, which is a flow passage communication device corresponding in the flow management information to the flow determined to have an anomaly, the input flow volume and the output flow volume corresponding to the flow in the flow counter information, and determines, for each of the malfunctioning communication device candidates, whether an anomaly has occurred in the malfunctioning communication device candidate on the basis of a second comparison process for comparing the acquired input flow volume to the acquired output flow volume.

10. The communication system according to claim 9, wherein the management device acquires information for identifying the flow indicated by the flow condition information from the plurality of communication devices, and wherein the flow management information is updated on the basis of the acquired information.

11. A communication method by a communication device that forwards data, the communication device stores:

flow condition information for identifying a flow that is data having a common attribute; and flow counter information that indicates, for each flow, an input flow volume of a flow inputted to the communication device, and an output flow volume of a flow outputted by the communication device;

the communication method comprising:

identifying, by the communication device, a flow to which data inputted to the communication device belongs, with reference to the flow condition information;

updating, by the communication device, the input flow volume of the flow in the flow counter information;

identifying, by the communication device, a flow to which data outputted by the communication device belongs, with reference to the flow condition information;

updating, by the communication device, the output flow volume of the flow in the flow counter information; and identifying, by the communication device, a flow in which a communication anomaly has occurred on the basis of results of a comparison process for comparing the input flow volume to the output flow volume with reference to the flow counter information.

\* \* \* \* \*